(12) United States Patent
Wang et al.

(10) Patent No.: US 10,458,218 B2
(45) Date of Patent: Oct. 29, 2019

(54) METHOD OF MODELLING HYDROCARBON PRODUCTION FROM FRACTURED UNCONVENTIONAL FORMATIONS

(71) Applicants: Xiangzeng Wang, Xi'an (CN); Ruimin Gao, Xi'an (CN); Fanhua Zeng, Regina (CA); Shanshan Yao, Regina (CA); Hong Liu, Chongqing (CN); Quansheng Liang, Xi'an (CN)

(72) Inventors: Xiangzeng Wang, Xi'an (CN); Ruimin Gao, Xi'an (CN); Fanhua Zeng, Regina (CA); Shanshan Yao, Regina (CA); Hong Liu, Chongqing (CN); Quansheng Liang, Xi'an (CN)

( * ) Notice: Subject to any disclaimer, the term of this patent is extended or adjusted under 35 U.S.C. 154(b) by 646 days.

(21) Appl. No.: 14/978,037

(22) Filed: Dec. 22, 2015

(65) Prior Publication Data
US 2017/0175494 A1    Jun. 22, 2017

(51) Int. Cl.
*G06F 17/50*     (2006.01)
*E21B 43/26*     (2006.01)
*G06F 17/11*     (2006.01)

(52) U.S. Cl.
CPC ............. *E21B 43/26* (2013.01); *G06F 17/11* (2013.01)

(58) Field of Classification Search
CPC .............................. E21B 49/00; G06F 17/5018

USPC ............................................ 703/2, 10
See application file for complete search history.

(56) References Cited

U.S. PATENT DOCUMENTS

| | | | |
|---|---|---|---|
| 9,285,500 B2 * | 3/2016 | Gorell ................ | G01V 9/00 |
| 2017/0254736 A1 * | 9/2017 | Xu ..................... | G01N 15/08 |
| 2018/0016895 A1 * | 1/2018 | Weng .................. | E21B 49/00 |

\* cited by examiner

*Primary Examiner* — Andy Ho
(74) *Attorney, Agent, or Firm* — Shumaker, Loop & Kendrick, LLP

(57) ABSTRACT

A method of modeling hydrocarbon flow from a fractured unconventional reservoir, where the formation has variability in stimulated reservoir properties caused by multi-stage fracturing treatment. A map is created which divides the formation into a plurality of closed production regions, each of which in turn is divided into a plurality of flow sub-systems extending between fractures in the formation. Production behavior is then calculated for each flow sub-system based on the geography and characteristics of the individual flow sub-system. Region hydrocarbon flow for each closed production region is determined by coupling the calculated production behavior of the flow sub-systems and the reservoir hydrocarbon flow can be modeled by aggregating the region hydrocarbon flows. Type curves showing the modeled hydrocarbon flow at selected points in time can then be plotted.

46 Claims, 13 Drawing Sheets

METHOD OF MODELLING HYDROCARBON PRODUCTION FROM FRACTURED UNCONVENTIONAL FORMATIONS

TECHNICAL FIELD

The invention related to methods of generation of hydrocarbon production curves from geological formations, and more specifically provides a method for the generation of curves of hydrocarbon production from unconventional reservoirs stimulated by multi-stage hydraulic fractures.

BACKGROUND

There is a long history of technological development and innovation in the field of hydrocarbon exploration and extraction. As a capital intensive industry, the hydrocarbon extraction industry has much incentive to optimize and maximize production from particular hydrocarbon-bearing formations. For example, unconventional reservoirs are hydrocarbon reservoirs where permeability is low and stimulation is required for profitable production.

In the production of hydrocarbon from unconventional geologic formations such as shale, one common extraction optimization technique is to stimulate the hydrocarbon reservoir by creating multiple hydraulic fractures along a multi-stage fractured horizontal well. This technique is commonly referred to as "fraccing". The resulting hydrocarbon production in a fraccing scenario is a result of flow in matrix, in natural fracture networks and in the hydraulic fractures themselves.

There are a number of problems in trying to model hydrocarbon production in a fractured geological formation with high heterogeneity. For example, during multi-stage hydraulic fracturing, some pre-existing natural fractures are reactivated. Hydraulic fractures and the active natural fractures comprise a hydraulically conductive flow network for hydrocarbon production. In other circumstances, unconventional formations along the horizontal well are known to be highly heterogenous in petrophysical and geological characteristics. In this type of the circumstance, the formation reacts differently at different fracturing stages and the generated fracture network along the horizontal well was also highly heterogenous. A modeling method can only be reliable by incorporating consideration of the heterogeneity of these post fracturing unconventional formations.

Innovative fracturing techniques are also being developed and used by many frac companies, including two representative techniques referred to under the SIMULFRAC and ZIPPERFRAC brands. In either the SIMULFRAC or ZIPPERFRAC methods, two or more Parallel horizontal wells are drilled and then perforated and fractured an alternate intervals along the wellbore. This creates a high density network of hydraulic fractures and accordingly, the stimulated volume that each hydraulic fracture can control is relatively reduced. The stimulated volume beyond hydraulic fracture tips also becomes smaller and its inside flow may no longer behave like linear flow. Existing modeling methods are inapplicable, if they assumed that the flow beyond the fracture tips is linear.

Another complication is that fluid flow mechanisms in unconventional reservoirs are quite complex when compared with conventional formations. Darcy's law is always deficient in such reservoirs. Gas diffusion and desorption appear simultaneously in production of some unconventional gas reservoirs. Moreover, high dependence of reservoir permeability on stress is been confirmed by many experiments. Few methods have been developed in any technical literature or approach to comprehensively incorporate all of these complex flow mechanisms into modeling or evaluating the production of unconventional reservoirs.

Another one of the issues associated with the modelling or execution of fracture treatment in unconventional formations is the difficulty associated with forecasting or accurately modelling the likely production from the formation. Although complex analytical and numerical methods may be developed to represent the fluid flow towards a multi-stage fractured horizontal well, these methods require high computing capacity, long computing time, and also show difficulty in iterative applications. One of the main technical reasons for the difficulty in these computations is the low matrix permeability.

Hydrocarbon produced from each fracture stage mainly comes from stimulated reservoir volume around the hydraulic fracture(s), which provides possibilities for decomposing the reservoir into smaller parts. A fast, simple and reliable method of considering the production from an unconventional reservoir, based upon a decomposition of the unconventional reservoir into smaller parts would it is believed be well received.

If it were possible to create a method for the generation of a type curve of hydrocarbon production from an unconventional reservoir which is stimulated by multi-stage hydraulic fractures this would be desirable in the hydrocarbon production industry.

BRIEF SUMMARY

The invention comprises a method of modeling hydrocarbon flow from a fractured unconventional reservoir which has been subjected to multi-stage fracturing. The invention develops type curves of hydrocarbon production from unconventional reservoirs stimulated by multi-stage hydraulic fractures. The type curves refer to a series of curves with time as x-axis and production rates q/bottomhole pressure p/bottomhole pressure derivatives as y-axis under specified reservoir conditions. Type curves can help predict reservoir properties, fracture properties and production trend by matching field production data.

In some embodiments, a method of modeling hydrocarbon flow from a fractured unconventional reservoir may include gathering relative data corresponding to an unconventional reservoir which has been subjected to multi-stage hydraulic fracturing, using the relative data, modeling the sub-system hydrocarbon flow for each of the group of flow sub-systems based upon the at least one set of reservoir properties assigned thereto and the relative data corresponding to the flow sub-system, modeling region hydrocarbon flow for each closed production region by coupling the calculated sub-system hydrocarbon flows for each of the flow sub-systems within the closed production region, and/or modeling reservoir hydrocarbon flow for the unconventional reservoir by coupling the calculated region hydrocarbon flows for each of the group of closed production regions.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The present invention is a method of modeling hydrocarbon flow from a fractured unconventional reservoir. The "unconventional reservoir" implies a reservoir where permeability is low and stimulation is required for profitable production. Multi-stage hydraulic fracturing techniques are often used to maximize oil and gas hydrocarbon recovery from such a formation, and the type curve is a useful modeling technique used to assess reservoir productivity.

A type curve is a visual tool used to evaluate hydrocarbon production—it is a graph with time as x-axis and production rates q/bottomhole pressure p/bottomhole pressure derivatives as y-axis under specified reservoir conditions. Typically multiple type curves are generated based on adjustments to formation paramaters. Type curves can help predict reservoir properties, fracture properties and production trend by matching field production data.

As outlined herein, the invention comprises a method of modeling hydrocarbon flow from a fractured unconventional reservoir. Current techniques for hydrocarbon production modeling in a fractured unconventional reservoir are time consuming, and less accurate than they could be in certain cases. The current method, of effectively deconstructing the particular unconventional reservoir into a plurality of closed production regions and a plurality of flow sub-systems therein, each of which accommodates individual hydraulic fracture locations in the formation, provides a more accurate outcome with higher efficiency as well as speed of rendering the completed type curves in question.

Figure 1:
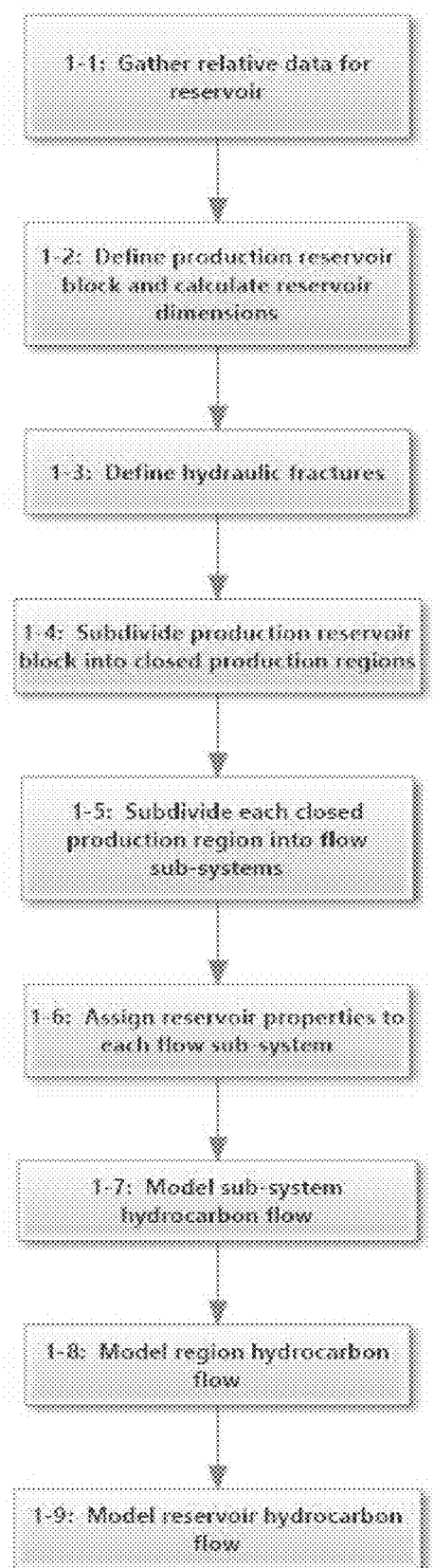
FIG. 1 is a flowchart showing the steps in one embodiment of the method of modeling hydrocarbon flow from a fractured unconventional reservoir of the present invention.

Method Overview:

FIG. 1 is a flow chart demonstrating the steps of the method of the present invention, which we first refer to. As outlined herein, the invention is a method of modeling hydrocarbon flow from a fractured unconventional reservoir-type curves of hydrocarbon production parameters in an unconventional reservoir are generated based on the modelling technique outlined herein.

The first step in the method of modeling hydrocarbon flow from a fractured unconventional reservoir of the present invention is to assemble relative data corresponding to the unconventional reservoir, which has been subjected to multi-stage hydraulic fracturing either natural or manmade. This is shown at Step 1-1. The relative data which would be useful to the present method would include, but not be limited to, mineral land data, production history, fracture treatment record and microseismic activity. The relative data will be used in the remainder of the method of modeling hydrocarbon flow from a fractured unconventional reservoir to render models of the unconventional reservoir, a production reservoir block, and the location and characteristics of hydraulic fractures which are used in determining reservoir hydrocarbon flow.

Following the assembly of the relative data, the relative data is used in the next step of the method of modeling hydrocarbon flow from a fractured unconventional reservoir—shown at Step 1-2. The first element of this next step is to define a production reservoir block, which is the primary hydrocarbon producing region within the unconventional reservoir which it is desired to model. Using the relative data the production reservoir block can be selected from the overall geology of the unconventional reservoir. In addition to selecting the overall shape and size of the production reservoir block, the reservoir dimensions being the length, width and height of the production reservoir block will also be determined. The production reservoir block volume and other calculations related to the reservoir hydrocarbon flow can be calculated using the reservoir dimensions.

Following the definition of the production reservoir block and determination of the reservoir dimensions, the hydraulic fracture locations and fracture properties of each of the at least one hydraulic fracture within the production reservoir block will also be determined and reflected in the model of the production reservoir block. This is shown at Step 1-3. Hydraulic fracture locations are important parameters to the remainder of the modeling of the method of modeling hydrocarbon flow from a fractured unconventional reservoir of the present invention as the production reservoir block will be divided into a plurality of closed production regions based upon the hydraulic fracture locations.

The production reservoir block is then subdivided into a plurality of closed production regions based upon the hydraulic fracture locations therein—shown at 1-4. Each closed production region typically will contain at least one complete hydraulic fracture. Again, based upon the relative data associated with the particular selected area comprising each closed production region, the region dimensions for each closed production region, being the length, width and height of each such closed production region will be determined. In modeling each closed production region, the at least one hydraulic fracture therein can be centered in the closed production region, or can be uncentered therein. Both such approaches are contemplated herein.

Based upon the dimensions, geology and at least one hydraulic fracture located within each closed production region will be divided into a plurality of flow sub-systems. The division of each of the plurality of closed production regions into a plurality of flow sub-systems is shown at Step 1-5. Effectively the division of each closed production region into a plurality of flow sub-systems comprises parsing the closed production region into a granular set of sub-units each of which can best be accurately and quickly modeled from a production perspective, based upon the granularity of the available relative data and conditions therein for that purpose.

Next at 1-6, each flow sub-system will then have at least one set of reservoir properties assigned thereto, which are additional parameters in addition to the dimensions and other available relative data which can be used to formulaically determine the likely hydrocarbon flow in the flow sub-system. A number of different types of reservoir properties can be relevant to formation production and to the modeling and creation of type curve related to unconventional reservoirs where multi-stage hydraulic fracturing will be or have been employed. These include reservoir properties as well as fracture properties. The reservoir properties mainly include matrix permeability k and porosity $\varphi$. The fracture properties refer to properties of natural fracture and hydraulic fracture, which include fracture permeability $k_F$, fracture porosity $\varphi_F$, fracture thickness/width $w_f$, fracture compressibility $c_F$, and hydraulic fracture half-length $x_f$.

With the production reservoir block having been defined and subdivided into a plurality of closed production regions each comprising a plurality of flow sub-systems, the modeling of the actual production of hydrocarbons from each flow sub-system can be commenced (shown at 1-7), for subsequent coupling to yield a completed calculation of reservoir hydrocarbon flow. This is done by firstly, with respect to each flow sub-system, modeling the sub-system hydrocarbon flow based upon the at least one set of reservoir properties assigned in respect of the flow sub-system in question. There are many ways that the sub-system hydrocarbon flow will be able to be modeled, as will be understood to those skilled in the art, and all such approaches are contemplated within the scope of the present invention. It is specifically contemplated that the sub-system hydrocarbon flow could be modeled by the creation of a sub-system partial differential flow equation which is a partial differential equation which could be coupled to similar partial differential equations for adjacent flow sub-systems in the assembly of a grouped total region hydrocarbon flow etc. The sub-system partial differential flow equation could comprise at least one of a linear flow equation, a radial flow equation, or a source/sink function.

In an embodiment where the sub-system hydrocarbon flow is modeled by the creation of such a sub-system partial differential flow equation, the sub-system partial differential flow equation could use the available and relevant relative data along with the assigned at least one set of reservoir properties in respect of the flow sub-system in question. The same type of a partial differential equation could be created for the modeling of the sub-system hydrocarbon flow for each flow sub-system within the closed production region or within the production reservoir block, or different types of sub-system partial differential flow equations could be used for different flow sub-systems based upon the available parameters, and the geology and other characteristics of the assigned area comprising the flow sub-system.

Following the modeling of the production from each flow sub-system, the next step in the method of the present invention is the modeling of the anticipated region hydrocarbon flow for each of the plurality of closed production regions (Step 1-8) which is done by aggregating the anticipated sub-system hydrocarbon flow for all of the flow sub-systems within the closed production region. Where the anticipated sub-system hydrocarbon flow for each flow sub-system within the closed production region is represented by a sub-system partial differential flow equation, the region hydrocarbon flow can be modeled by the coupling of said sub-system partial differential flow equations. The precise coupling of such sub-system partial differential flow equations to yield a rolled up model of the anticipated region hydrocarbon flow will be understood by those skilled in geology and mathematics and all such approaches again are contemplated within the present invention. The region hydrocarbon flow might be represented by another region partial differential flow equation, or otherwise, and all such approaches again are contemplated herein.

Finally the reservoir hydrocarbon flow can be modelled (Step 1-9) by aggregating the region hydrocarbon flow for each of the plurality of closed production regions within the production reservoir block. This again can be done either by coupling region partial differential flow equations representing the anticipated aggregated hydrocarbon flow from each of the flow sub-systems within each of the plurality of closed production regions, or in other approaches and again all are contemplated within the scope hereof.

Where each sub-system partial differential flow equation is a couplable partial differential equation, the solution to each sub-system partial differential flow equation can represent production pressure and production volume rate for the corresponding flow sub-system. Similarly where the region hydrocarbon flow is represented by a couplable differential region partial differential flow equation, the solution to such a region partial differential flow equation can represent production pressure and production flow rate for the corresponding closed production region. If the reservoir hydrocarbon flow is modeled as a coupled reservoir flow equation comprised of the solutions of a plurality of region partial differential flow equations, the solution to the reservoir flow equation represents production pressure and production flow rate for the unconventional reservoir.

The method of FIG. 1 can be enhanced by the plotting of one or more type curves using the modeled reservoir production. Following the modelling of the anticipated reservoir hydrocarbon flow from the production reservoir block, being the production pressure and production volume rate therefrom, one or more type curves can be created using said reservoir hydrocarbon flow in a following step. Type curves could be generated at the flow sub-system, closed production region, or production reservoir block level. The flowchart of FIG. 2 demonstrates an extension of the method of FIG. 1 in which the first nine steps are the same as the method of FIG. 1, with the plotting of one or more type curves shown at Step 2-10.

Figure 2:
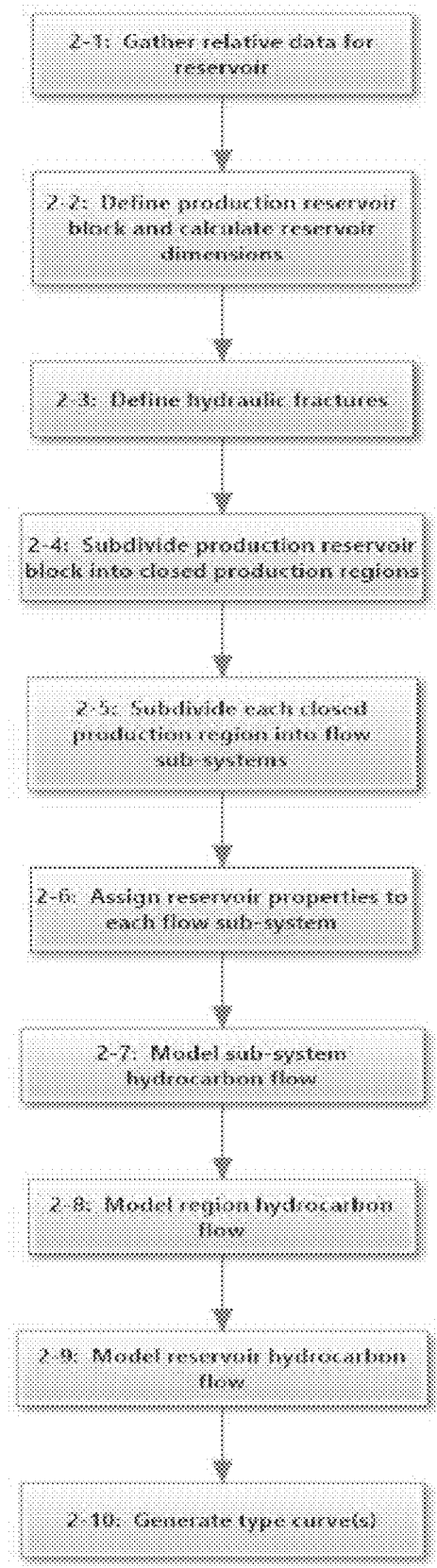
FIG. 2 is a flowchart of the method of FIG. 1, adding the step of the generation of type curves from the modeled reservoir production.
Figure 3:
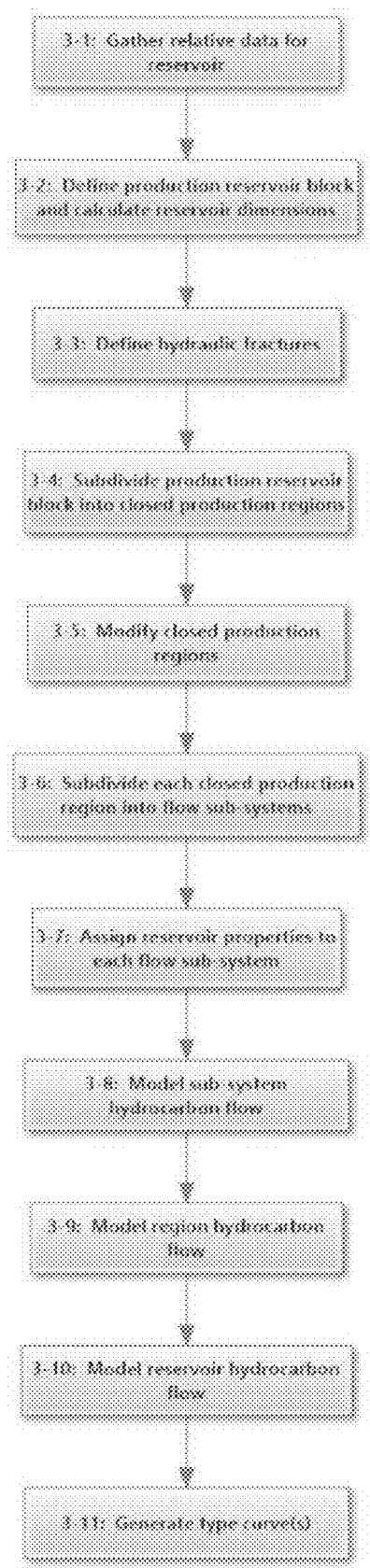
FIG. 3 is a flowchart of the method of FIG. 2, adding the step of modification of the plurality of closed production regions once initially calculated.

A further modification of the underlying method of modeling hydrocarbon flow from a fractured unconventional reservoir of the present invention of FIG. 1 or FIG. 2 is shown in FIG. 3. The difference in the steps of the method shown in FIG. 3 versus that of FIG. 2 is the insertion of Step 3-5, following the subdivision of the production reservoir block into a plurality of closed production regions, showing the manual or interventionist modification of at least one of the plurality of closed production regions following their initial determination or assignment. The remainder of the steps shown in FIG. 3 are the same as those of the method embodiment of FIG. 2, subject to the renumbering of the steps sequentially after the insertion of Step 3-5 therein.

Modeling Examples:

Having reviewed the method of modeling hydrocarbon flow from a fractured unconventional reservoir in high level concept, we now wish to outline the efficacy of the method itself and describe in further detail the development of the production reservoir block, the plurality of closed production regions and plurality of flow sub-systems with respect to a particular unconventional reservoir.

Figure 4:
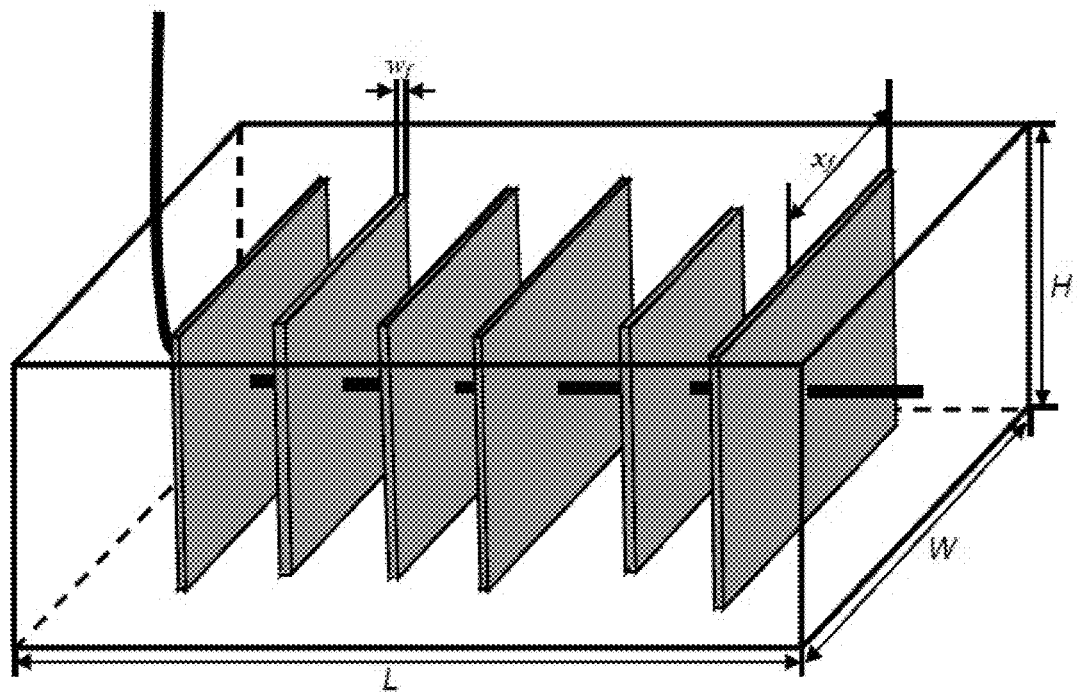
FIG. 4 is a schematic representation of an unconventional reservoir stimulated by multi-stage hydraulic fracturing.

FIG. 4 shows one embodiment of an unconventional reservoir which has been stimulated with multi-stage hydraulic fracturing. A multi-stage fractured horizontal well is shown centered therein. In this FIG. 4 the production reservoir block refers to the primary hydrocarbon producing region within the unconventional reservoir which it is desired to model. The reservoir length L in FIG. 4 equals the wellbore's horizontal length. Well spacing is chosen as the width W. In general, the target formation thickness works as the height H. For the fractured horizontal well, each hydraulic fracture has half length $x_f$ and width $w_f$. The hydraulic fracture numbers, locations and intervals are determined based on fracturing treatment records. According to treatment records, hydraulic fracturing is always completed in several stages with several perforation clusters per stage. Some embodiments take one fracture per stage when calculating fracture numbers and spacing while some embodiments may consider one fracture per perforation cluster. The numbering or grouping of the hydrs could vary and any approach thereto is contemplated within the scope of the present invention.

The hydraulic fractures shown in FIG. 4 are assumed to fully penetrate the target formation and therefore have same height as the reservoir height H. Fracture properties in any two hydraulic fractures can be different as well.

Figure 5:
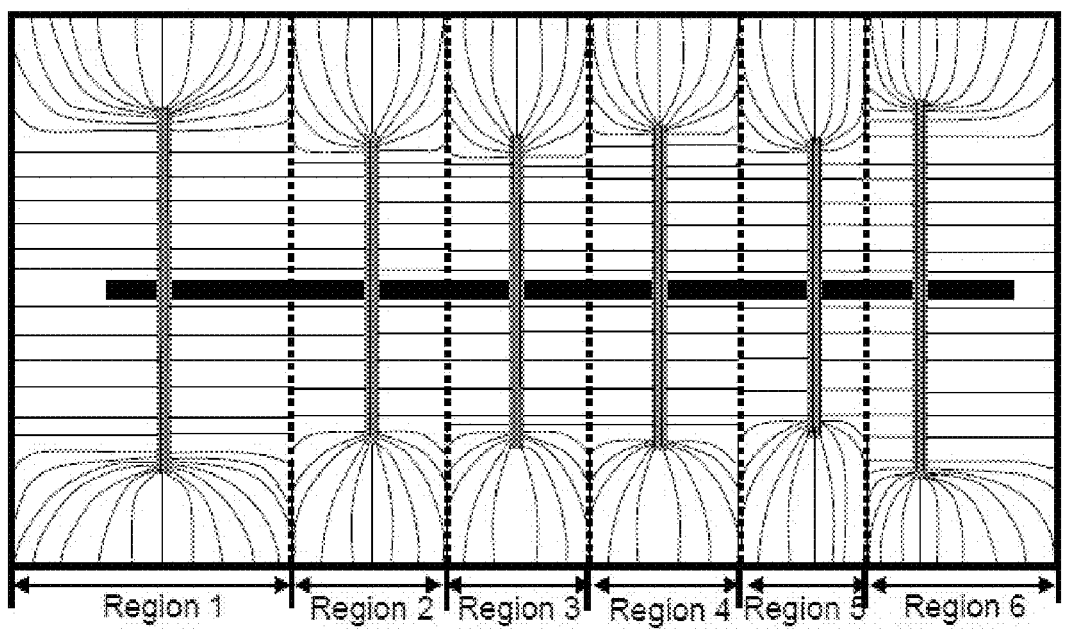
FIG. 5 is a plan view of streamlined distribution in the unconventional reservoir of FIG. 4.

Although the stimulated reservoir is complex, certain methods can still lead to fast, simple and reliable modeling of the inside fluid flow. FIG. 5 shows the streamline distribution during production for the stimulated production reservoir block in FIG. 4. Streamlines represent a snapshot of the instantaneous flow field. For simplicity, the production reservoir block in FIG. 5 is homogeneous and single-porosity. Streamlines show that each hydraulic fracture controls a part of the production reservoir block where the fluid only flows towards this hydraulic fracture. Corresponding to the six hydraulic fractures in FIG. 5, the production reservoir block comprises six closed production regions with all-closed outer boundaries. No fluid flows across these boundaries. Each closed production region further comprises four kinds of fluid flow. Since the flow distribution is symmetrical to the wellbore, studying half of the production reservoir block is enough for building reliable models. Referring for example to Region 1 of the formation shown in FIG. 5, in the upper part of Region 1, streamlines show that flow from the production reservoir block in this area converges towards the hydraulic fracture tips. On the left and right of Region 1, flows down to the hydraulic fracture from both sides are normal to the fracture plane and in the hydraulic fracture of Region 1, inside flow moves towards the horizontal wellbore.

Complex fluid flows in the stimulated production reservoir block can be reduced to several kinds of simple flows, which provides the basis for this invention. The simple flows within the flow sub-systems and closed production regions then give type curves for the whole production reservoir block. For each kind of simple flow in FIG. 5, mathematical solutions exist in Laplace domain to describe corresponding instantaneous pressure/flow rates field.

Figure 6:
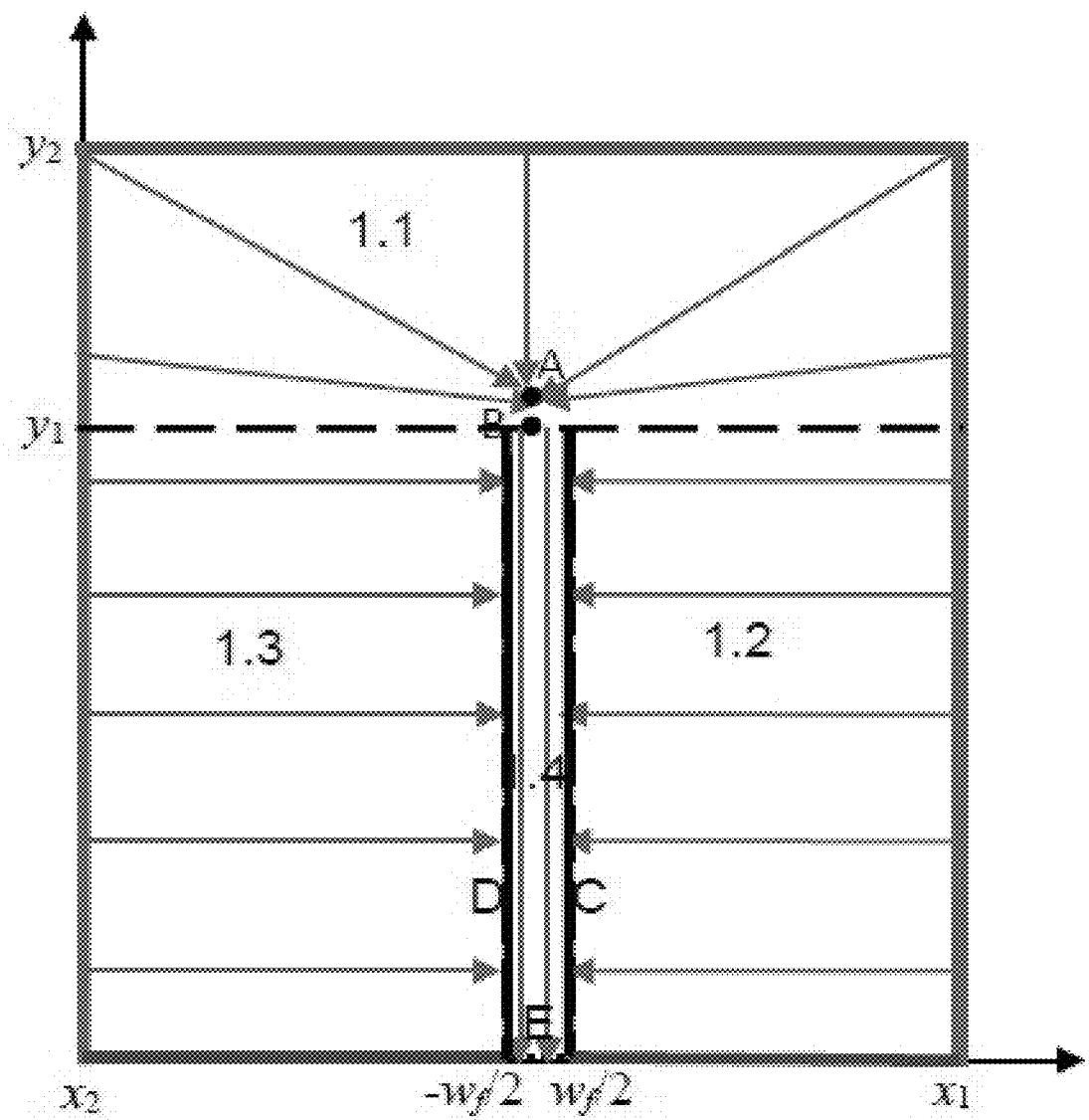
FIG. 6 demonstrates the subdivision of a closed production region of FIG. 5 into a plurality of flow sub-systems in accordance with one embodiment of the present invention (Region 1 of FIG. 5)
Figure 7:
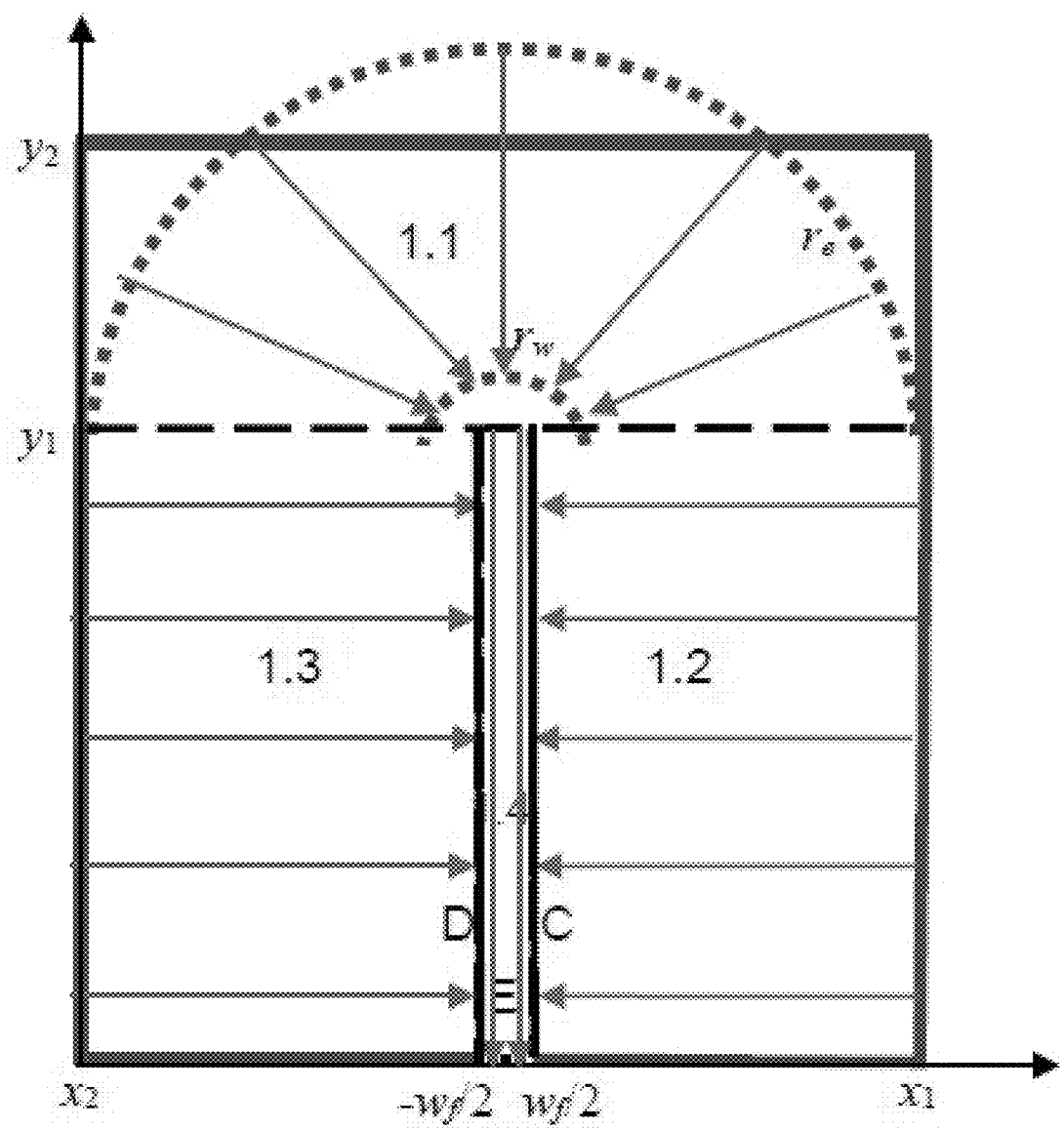
FIG. 7 demonstrates an alternate embodiment of the subdivision of a closed production region of FIG. 5 into a plurality of flow sub-systems in accordance with the present invention (Region 1 of FIG. 5)

Region 1 of FIG. 5 is divided into four flow sub-systems. Each flow sub-system contains one kind of simple fluid flow (arrows show fluid direction), and each of these flow sub-systems has independent reservoir properties. FIG. 6 and FIG. 7 show two samples of the flow sub-systems for Region 1 in FIG. 5.

In the flow sub-system shown in FIG. 6, the flow towards fracture tips is shown in terms of Green's function method. A line sink exists at Point A. The Green's function for a line sink in the closed rectangular flow sub-system shown is calculated as follows:

$$\overline{p}_{1D}(x_D, y_D) = 2\pi L_r^2 \overline{q}_{1D} \int_0^\infty S_x S_y e^{-ut_D} dt_D \qquad (2.1)$$

$$S_x = \frac{1}{2l\sqrt{\pi \eta_1 (t_D - \tau_D)}} \qquad (2.2)$$

$$\sum_{n=-\infty}^{\infty} \left\{ \exp\left[-\frac{(x_D - x_{AD} + n)^2}{\eta_1 (t_D - \tau_D)}\right] + \exp\left[-\frac{(x_D + x_{AD} + n)^2}{\eta_1 (t_D - \tau_D)}\right] \right\}.$$

$$S_y = \frac{1}{2l\sqrt{\pi \eta_1 (t_D - \tau_D)}} \qquad (2.3)$$

$$\sum_{n=-\infty}^{\infty} \left\{ \exp\left[-\frac{(y_D - y_{AD} + n)^2}{\eta_1 (t_D - \tau_D)}\right] + \exp\left[-\frac{(y_D + y_{AD} + n)^2}{\eta_1 (t_D - \tau_D)}\right] \right\}$$

where
$p_{1D}$ is the dimensionless pressure in sub-system 1.1, $$\frac{2\pi k H (p_i - p_1)}{QB\mu}.$$

$t_D$ is the dimensionless time, $kt/(\phi \mu c_1 L_r^2)$.
$\eta_1$ is the dimensionless reservoir diffusivity of sub-system 1.1, $$\left(\frac{k_1}{\phi_1 \mu c_{t1}}\right) / \left(\frac{k}{\phi \mu c_t}\right).$$

$q_{1D}$ is the dimensionless flow rate into the line sink at Point A in sub-system 1.1, $q_1/Q$.
B is the formation volume factor.
Q, $\mu$, Lr, $c_1$ and $\Phi$ are production rate, viscosity, length, compressibility and porosity used as reference values in dimensionless definition, respectively.

When applying radial equations, embodiments here assume a semi-radial reservoir with Dietz shape factor is equivalent to sub-system 1.1. FIG. 7 shows the hypothetical radial sub-system 1.1 in dash lines with boundaries $r_w$ and $r_e$. The radial flow equation of sub-system 1.1 in Laplace domain is $$\frac{1}{r_D} \frac{\partial}{\partial r_D}\left(r_D \frac{\partial \overline{p}_{1D}}{\partial r_D}\right) - \frac{s}{\eta_1} \overline{p}_{1D} = 0, \qquad (1.1)$$

with outer boundary condition $$\left.\frac{\partial \overline{p}_{1D}}{\partial r_D}\right|_{r_D} = 0 \qquad (1.2)$$

where
s is the Laplace variable.
$r_D$ is the dimensionless hypothetical radius, $r/L_r$.

Detailed descriptions and solutions of the radial flow equations and Green's function in Laplace domain are fully described via several references including E. Stalgorova, L. Mattar "Analytical Model for Unconventional Multifractured Composite systems" SPE Reservoir Evaluation & Engineering, SPE 162516 and S. Yao, F. Zeng, H. Liu, G. Zhao, "A Semi-analytical Model for Multi-stage Fractured Horizontal Wells" Journal of Hydrology 507: 201-212. In designing the plurality of closed production regions of any unconventional reservoir, closed boundaries are usually placed at the center of two adjacent hydraulic fractures. However, closed boundaries can also lie off the center. The final sizes of each closed production region are determined based on best matching results.

In designing flow sub-systems of any closed production region, $y_1$ in FIG. 6 or FIG. 7 is usually smaller than $x_f$. When Green's function is applied, location of Point A is (0, $y_1+\Delta y$) and location of Point B is (0, $y_1$). The final values of $y_1$ and $\Delta y$ are determined based on best matching results.

In sub-systems 1.2 and 1.3, linear flow equations can describe the fluid flow normal to hydraulic fracture planes C and D. For example, the linear sub-system partial differential flow equation of sub-system 1.2 is:

$$\frac{\partial^2 \bar{p}_{2D}}{\partial x_D^2} - \frac{s}{\eta_2}\bar{p}_{2D} = 0 \quad (3.1)$$

$$\frac{\partial \bar{p}_{2D}}{\partial x_D}\bigg|_{x_{1D}} = 0 \quad (3.2)$$

Detailed descriptions and solutions of linear flow equations in Laplace domain are fully described via several references including one SPE paper M. Brown, E. Ozkan, R. Raghavan, H. Kazemi "Practical Solutions for Pressure-Transient Response of Fractured Horizontal Wells in Unconventional Shale Reservoirs" SPE Reservoir Evaluation & Engineers SPE 12504.

In sub-system 1.4, a modified linear flow equation can describe the fluid flow inside the hydraulic fracture. Sub-system 1.4 that is connected to wellbore has the sub-system partial differential flow equation:

$$\frac{\partial^2 \bar{p}_{FD}}{\partial y_D^2} + \frac{2\pi k L_r^2}{w_f k_f}\bar{q}_{2FD} - \frac{2\pi k L_r^2}{w_f k_f}\bar{q}_{3FD} - \gamma \bar{p}_{FD} = 0, \quad (4.1)$$

$$\frac{\partial \bar{p}_{FD}}{\partial y_D}\bigg|_0 = -\frac{2\pi}{F_{CD}}\bar{q}_{D,region1} \quad (4.2)$$

Where $F_{CD}$ is the dimensionless fracture conductivity, $(k_F w_F)/(kL_r)$.

$q_{2F}$ and $q_{3F}$ are the flow rates into the hydraulic fracture from Planes C and D.

$q_{region1}$ is the flow rate out of Region 1 through the intersection of hydraulic fracture and horizontal wellbore, $q_{region1}/Q$.

Detailed description and solutions of this linear equation in Laplace domain are fully described via several references including L. Larsen, T. M. Herge, "Pressure Transient Analysis of Multifractured Horizontal Wells" SPE 28389. For initial conditions, pressure is equal to initial reservoir pressure in all flow sub-systems.

Following this work with respect to individual flow sub-systems, the next step in the method of modeling hydrocarbon flow from a fractured unconventional reservoir is to couple the solutions and the sub-system partial differential flow equation for each of the plurality of flow sub-systems within each closed production region to derive a solution, representing a region partial differential flow equation for each closed production region. Referring to the examples shown for Region 1. Two cases exist in coupling sub-systems 1.1 and 1.4. If Green's functions are applied, the pressure at Point B($x_B$, $y_B$) in 1.1 is assumed to equal that on the fracture tip in 1.4. Also the sink rate at Point A in 1.1 equals to that through fracture tip. The coupling conditions become:

$$\bar{p}_{1D}(x_{BD}, Y_{BD}) = \bar{p}_{FD}(0, y_{1D}) \text{ and } \bar{q}_{1D} = -\frac{F_{CD}}{2\pi}\frac{\partial \bar{p}_{FD}}{\partial y_D} \quad (5)$$

If radial flow equations are applied in 1.1, both the pressure and flow rates out of inner boundary $r_{ew}$ in 1.1 are equal to those through the fracture tip in 1.4. The coupling conditions are $$\bar{p}_{1D}(r_{ewD}) = \bar{p}_{FD}\big|_{y_{1D}} \text{ and } \frac{k_1 r_{wD}}{k}\frac{\partial \bar{p}_{1D}}{\partial r_D}\bigg|_{r_{wD}} = -\frac{F_{CD}}{2}\frac{\partial \bar{p}_{FD}}{\partial y_D} \quad (6)$$

Pressure values in 1.2 and 1.4 at interface Plane C are the same. Similar condition also applies to interface Plane D. Flow rates into Plane C in 1.2 are equal to these out of Plane C in 1.4. Similarly, flow rates into Plane D in 1.3 are equal to these out of Plane D in 1.4. The coupling conditions are:

$$\bar{p}_{2D}\big|_{w_{fd}/2} = \bar{p}_{FD}\big|_{w_{fd}/2}, \bar{q}_{2FD} = \frac{k_2}{2\pi L_r}\frac{\partial \bar{P}_{2D}}{\partial x_D} \quad (7)$$

$$\bar{P}_{3D}\big|_{-w_{fD}/2} = \bar{p}_{FD}\big|_{-w_{fD}/2}, \bar{q}_{3FD} = -\frac{k_3}{2\pi L_r}\frac{\partial \bar{P}_{3D}}{\partial x_D}$$

There is no interaction among sub-systems 1.1, 1.2 and 1.3. At Plane E, flow rates out of the hydraulic fracture are assumed to equal $q_{region\ 1}$. Then the linear flow equation for sub-system 1.4 can be solved in Laplace domain under all above boundary and coupling conditions. The derived mathematical solution can give the instantaneous pressure at Plane E. Solutions for other regions can be derived in the same way.

Following the coupling of the sub-system partial differential flow equations into region partial differential flow equations for each closed production region, the next step in the method of modeling hydrocarbon flow from a fractured unconventional reservoir is to couple the region partial differential flow equations for the plurality of closed production regions to obtain a solution for the whole production reservoir block. After coupling the sub-system partial differential flow equations into region partial differential flow equations, the only unknown parameter in each region partial differential flow equation or solution is the flow rate out of a hydraulic fracture $q_{regioni}$ (i=1,2 . . . n, n is the number of hydraulic fractures). Since hydraulic fractures are connected by horizontal wellbore, the pressure at the end of hydraulic fractures are equal to each other. Furthermore, in mathematical modeling the horizontal well often operates at constant pressure or constant rate. By applying this additional condition, the method here develops a system of n linear equations and solves it analytically in Laplace domain. For instance, the system of linear equations under constant-rate production is like $$\begin{bmatrix} A_{11} & A_{12} & 0 & 0 & 0 & \ldots & 0 \\ 0 & A_{22} & A_{23} & 0 & 0 & \ldots & 0 \\ 0 & 0 & A_{33} & A_{34} & 0 & \ldots & 0 \\ \vdots & \vdots & \vdots & \vdots & \vdots & \vdots & \vdots \\ 0 & 0 & 0 & \ldots & 0 & A_{n-1,n-1} & A_{n-1,n} \\ 1 & 1 & 1 & 1 & 1 & 1 & 1 \end{bmatrix} \begin{bmatrix} \overline{q}_{D,region1} \\ \overline{q}_{D,region2} \\ \overline{q}_{D,region3} \\ \vdots \\ \overline{q}_{D,regionn-1} \\ \overline{q}_{D,regionn} \end{bmatrix} = \begin{bmatrix} 0 \\ 0 \\ 0 \\ \vdots \\ 0 \\ \frac{1}{2s} \end{bmatrix} \quad (8)$$

The solution of Eq. 8 gives the instantaneous bottomhole pressure and flow rates distribution along the horizontal wellbore in Laplace domain. Stehfest algorithm can convert values from Laplace domain to real-time domain. In Stehfest algorithm, pressure changes into real-time domain as $$p_D(t_D) = \frac{\ln 2}{t_D} \sum_{j=1}^{N_L} V_j \overline{p}_{Dj}(s_j) \quad (9)$$

The Stehfest algorithm is fully described in H. Stehfest, "Numerical Inversion of Laplace Transforms" Communications of the ACM 13 (1):47-49. This invention select a series of time points $t_D$, find corresponding Laplace time points s, calculate solutions at different time points s and convert results to real time space according to Eq. 9. The final real-time solution is a series of bottomhole pressure/flow rates at different time points. Type curves are generated based on the data of pressure/flow rates vs. time.

A real stimulated hydrocarbon reservoir might be more complex in geology and behaviour than that shown in FIG. 6 and FIG. 7—reservoir properties may change as the distance from hydraulic fractures increases. FIG. 8 through FIG. 11 show several additional complex combinations plurality of flow sub-systems within a closed production region.

Figure 8:
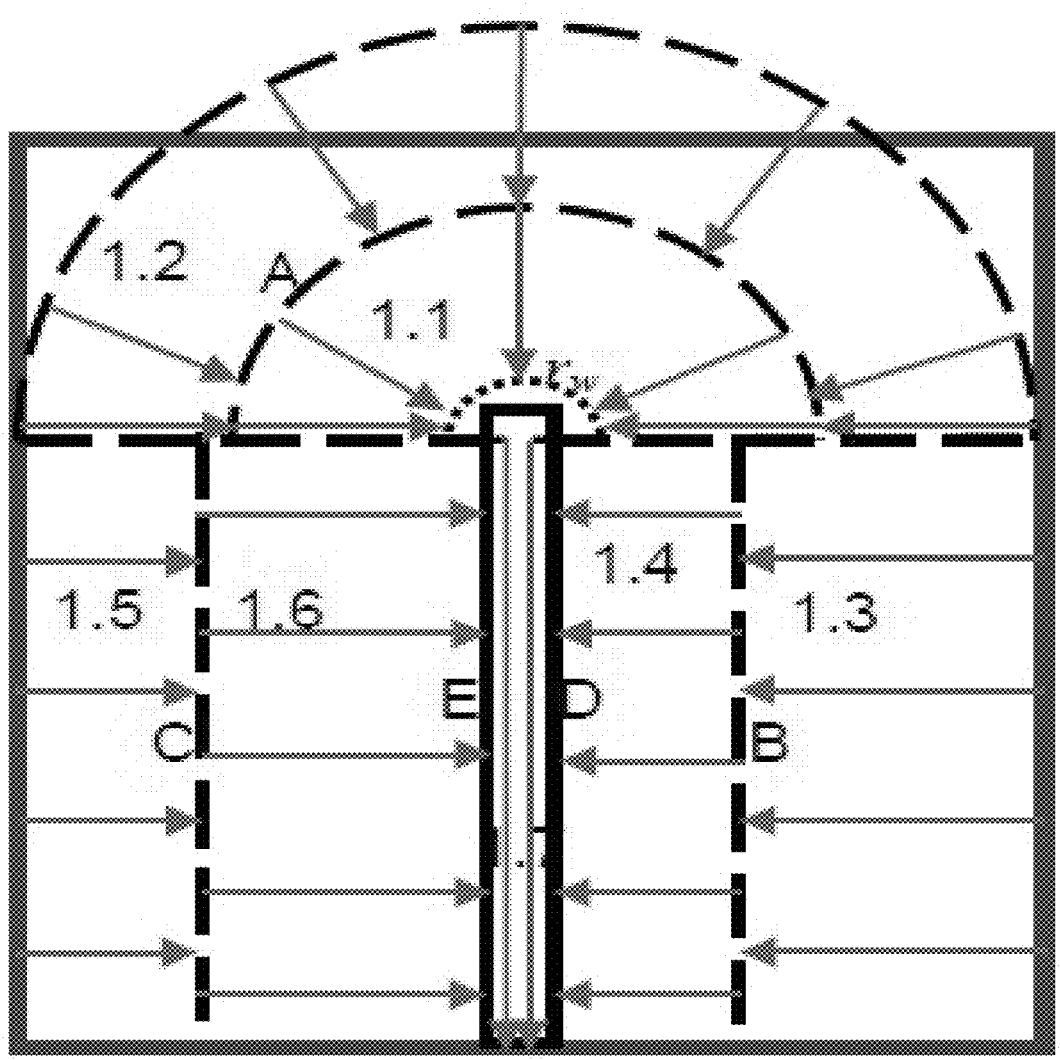
FIG. 8 demonstrates another embodiment of the subdivision of a closed production region into a plurality of flow sub-systems in accordance with the invention.

Referring first to FIG. 8, seven flow sub-systems exist within a closed production region. The flow sub-systems shown in this Figure can simulate an unconventional reservoir with gradual changes in reservoir properties throughout the production reservoir block. Each flow sub-system contains one kind of a simple flow and has independent reservoir properties. Radial flow moves through flow sub-system 1.2 towards flow sub-system 1.1. In flow sub-system 1.1, radial flow converges towards the inner boundary $r_w$. Flow sub-system 1.3 contains linear flow. Flow sub-system 1.4 receives flow from flow sub-system 1.3 and induces linear flow to the hydraulic fracture. Similarly, linear flows occur in flow sub-systems 1.5 and 1.6, and flow sub-system 1.7 has linear flow inside the hydraulic fracture. Governing equations of these flow sub-systems are already listed.

The coupling conditions for the sub-system partial differential flow equations based on the embodiment of FIG. 8 are different from those outlined above. The coupling approach shown in this context centers around coupling of the sub-system partial differential flow equation for flow sub-system 1.1 to the sub-system partial differential flow equation for flow sub-system 1.2 by equalizing pressure and flow rates across interface Plane A. The sub-system partial differential flow equations for flow sub-systems 1.3 and 1.4 are coupled under same pressure and flow rates across interface Plane B. he sub-system partial differential flow equations for flow sub-systems 1.5 and 1.6 are coupled with equal pressure and flow rates across interface Plane C. The sub-system partial differential flow equation for flow sub-system 1.7 is coupled with the sub-system partial differential flow equations for flow sub-systems 1.1, 1.4 and 1.6 by flow rates continuity across fracture tip and Planes D and E, respectively. The solution scheme, or the region partial differential flow equation, when completed is similar to the embodiments of FIG. 6 and FIG. 7. The resulting type curves can also match and predict reservoir production.

Figure 9:
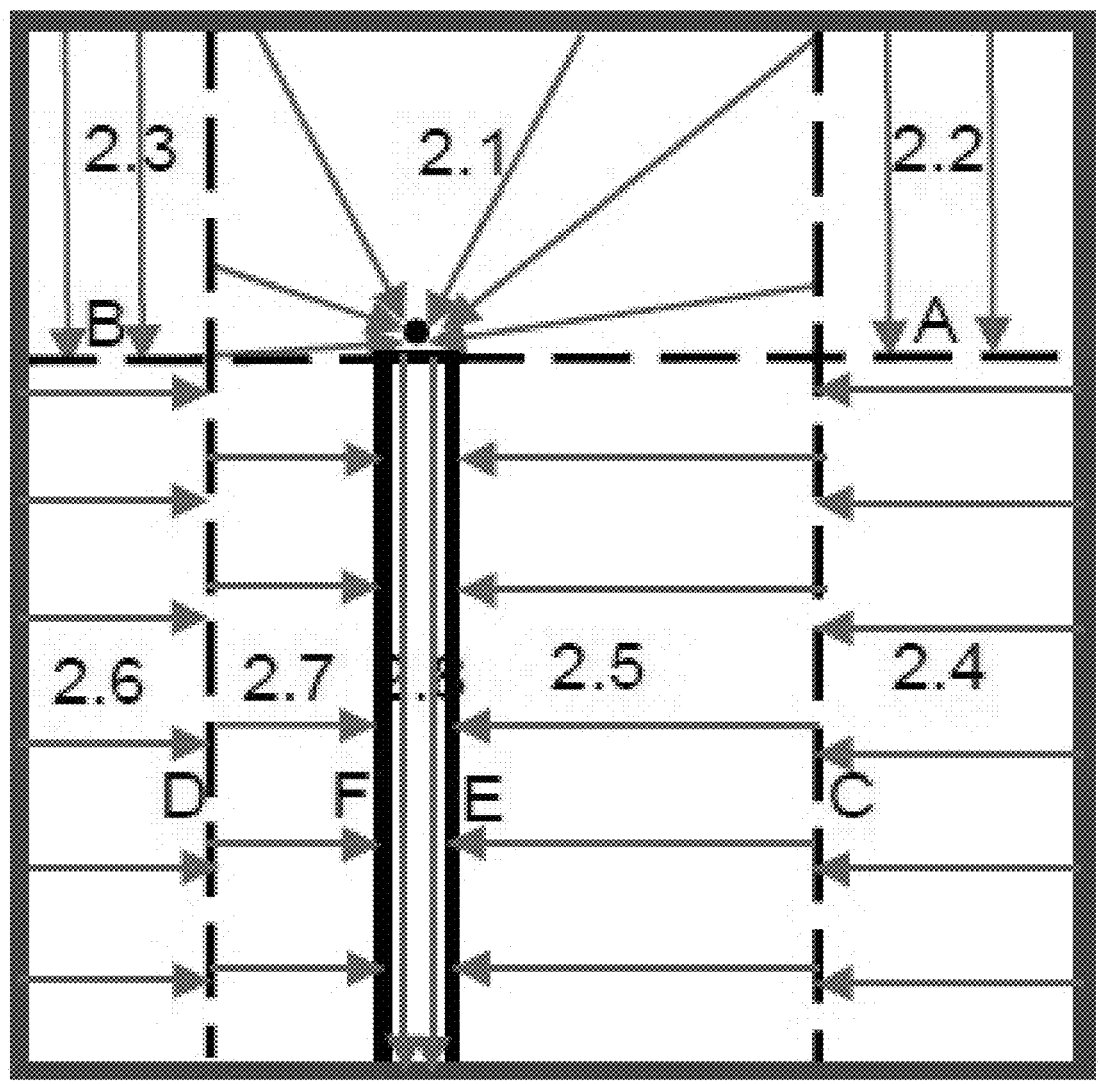
FIG. 9 demonstrates another embodiment of the subdivision of a closed production region into a plurality of flow sub-systems in accordance with the invention.

FIG. 9 shows another different combination of flow sub-systems within a closed production region. The closed production region of FIG. 9 is divided into eight flow sub-systems. Each og the flow sub-system in this Figure has one simple fluid flow. In flow sub-system 2.1, a line sink exists on the hydraulic fracture tip and Green's function method describes the pressure field. Linear flow goes through flow sub-system 2.2 towards flow sub-system 2.4. Likewise, linear flow in flow sub-system 2.3 enters flow sub-system 2.6. Flow sub-systems 2.4 and 2.5 obtain flow from adjacent flow sub-systems and develop inside linear flow. Flow sub-systems 2.6 and 2.7 also have linear flow. For flow sub-system 2.8, the hydraulic fracture receives flow from surrounding flow sub-systems and leads linear flow into horizontal wellbore. Governing equations of fluid flows in the eight flow sub-systems can be found from those in FIGS. 4 and 5.

Coupling conditions are different for the different combinations of flow sub-systems shown in FIG. 9. The flow into flow sub-system 2.4 is equal to that perpendicular to interface Plane A of flow sub-system 2.2. The flow into flow sub-system 2.6 is equal to that perpendicular to interface Plane B in flow sub-system 2.3. Flow sub-systems 2.4 and 2.5 are coupled under flow rates continuity across Plane C. Flow sub-systems 2.6 and 2.7 are also coupled based on flow rates continuity across Plane D. Flow sub-system 2.8 is coupled with flow sub-systems 2.1, 2.5 and 2.7 with flow continuity across fracture tip, Plane E and Plane F respectively. The solution scheme is similar to that of FIGS. 4 and 5. The resulting type curves can match and predict reservoir production. The selection of appropriate coupling conditions and other elements of the differential equations in question will be understood to those skilled in the art and the selection of appropriate conditions and equation elements are all contemplated within the scope of the present invention.

Figure 10:
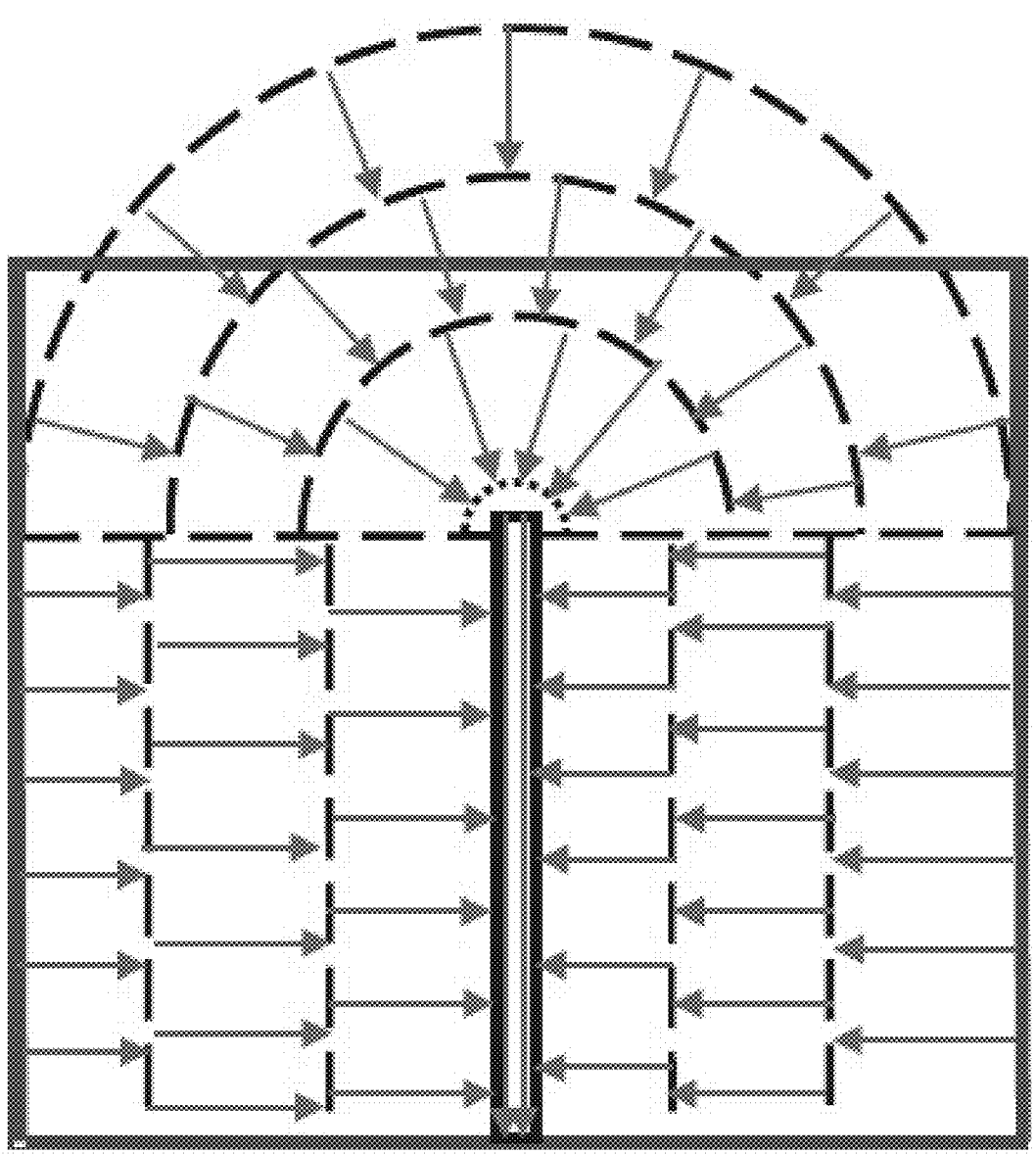
FIG. 10 demonstrates another embodiment of the subdivision of a closed production region into a plurality of flow sub-systems in accordance with the invention.
Figure 11:
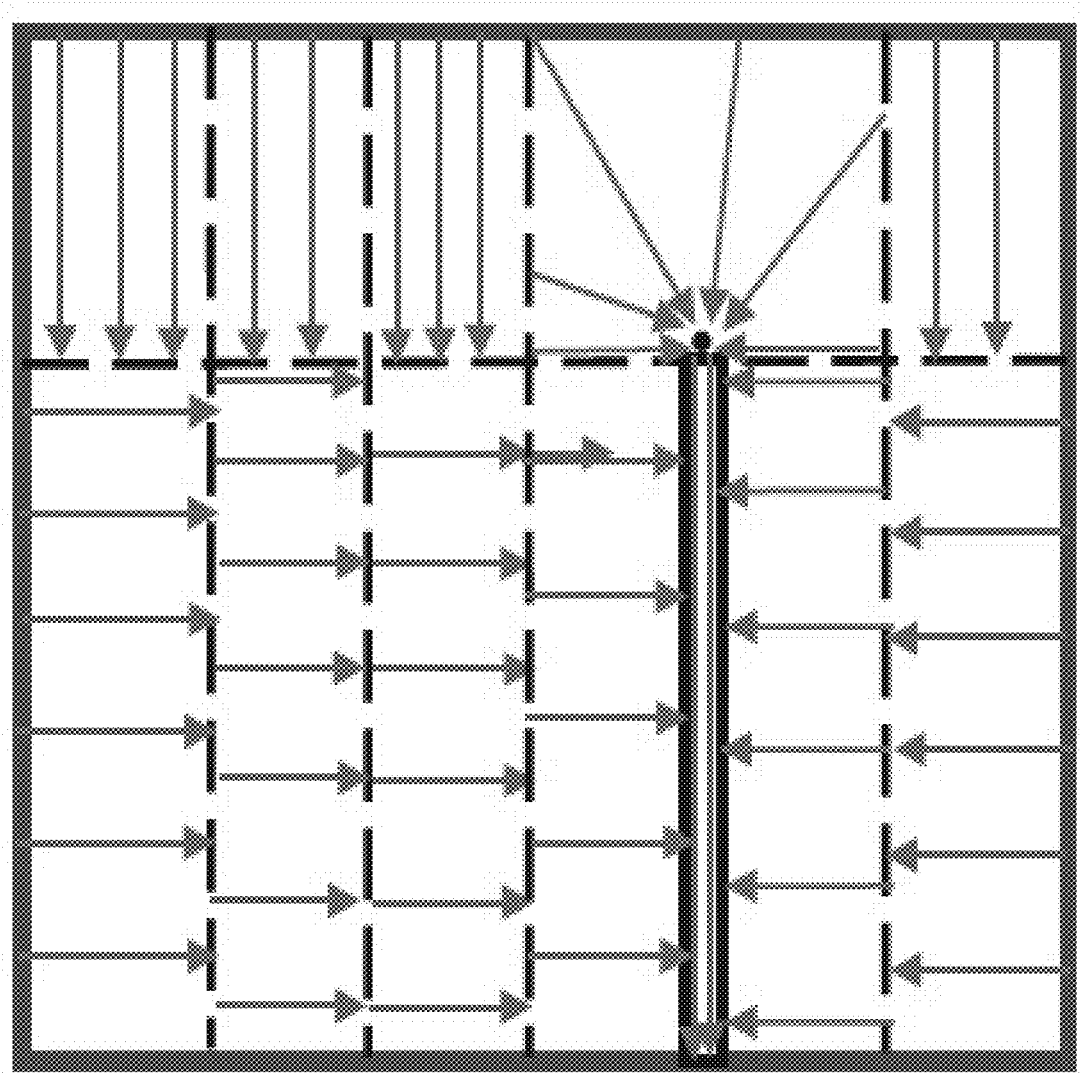
FIG. 11 demonstrates another embodiment of the subdivision of a closed production region into a plurality of flow sub-systems in accordance with the invention.

Modeling of another complex unconventional reservoir is shown with reference to FIG. 10. As the unconventional reservoir becomes more complex in fractures and flow, the method of modeling hydrocarbon flow from a fractured unconventional reservoir herein would simply divide the reservoir into a larger number of flow sub-systems within closed production regions. Referring to FIG. 10, seven flow sub-systems contain linear flow inside the unconventional reservoir and three flow sub-systems have radial flow towards the hydraulic fracture tip. In the embodiment of FIG. 11, eleven flow sub-systems have linear flow inside the reservoir and one flow sub-system has a line sink on the fracture tip. This implies that flow sub-systems in a closed production region are not fixed. Plenty of combinations of flow sub-systems exist according to this method. Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

One advantage of this invention is to easily model heterogeneous reservoirs. Heterogeneity is quite common for unconventional reservoirs. The reservoir properties around a horizontal wellbore can change significantly. To address heterogeneity, this invention can assign different reservoir properties to different flow sub-systems. Any two flow sub-systems can have different reservoir properties no matter the two sub-systems are in same region or not. For example, flow sub-systems 1.5 and 1.6 in FIG. 8 may have different reservoir properties although they are the same side of the hydraulic fracture. Also any two flow sub-systems can have different fracture properties. For example, fracture permeability in Region 1 of FIG. 5 can be different from that in Region 5.

One more advantage of this invention is to model dual-porosity reservoirs. Hydraulic fracturing may reactivate dead natural fractures and part of the reservoir may behave like dual-porosity. Dual-porosity reservoirs are composed of two mediums: reservoir matrix and natural fractures. Furthermore, such dual-porosity characteristics may change along the horizontal wellbore. In this invention, any flow sub-system can be easily modified to a dual-porosity flow sub-system. This modification introduces two new parameters, storability ratio ω and flow capacity ratio λ, to characterize natural fractures. Solutions of single-porosity flow sub-systems apply to dual-porosity flow sub-systems with modified Laplace variable u as $$u = sf(s) \tag{10.1}$$

$$f(s) = \begin{cases} \dfrac{s\omega(1-\omega)+\lambda}{s(1-\omega)+\lambda} \text{ for pseudosteady dual-porosity reservoir} \\ 1+\sqrt{\lambda\omega/(3s)}\tanh(\sqrt{3\omega s/\lambda}) \text{ for transient dual-porosity reservoir} \end{cases} \tag{10.2}$$

A detailed description of this modification is given in J. E. Warren, P. J. Root, "The Behavior of Naturally Fractured Reservoirs", SPE Journal SPE 426 and O. A. de Swaan "Analytical Solutions for Determining Naturally Fractured reservoir properties by Well Testing" SPE Journal SPE 5346. Likewise, any two flow sub-systems can have different dual-porosity parameters no matter if the two flow sub-systems are in same closed production region or not—the usual way is to make flow sub-systems dual porosity when they are closer to hydraulic fractures.

Another advantage of this invention is to easily consider complex flow mechanisms in shale gas reservoirs. Due to gas slippage, Knudsen diffusion and stress-sensitivity, reservoir matrix permeability becomes a function of reservoir pressure and gas properties besides intrinsic reservoir characteristics: F. Javadpour "Nanopores and Apparent Permeability of Gas Flow in Mudrocks (shale and siltstone)" Journal of Canadian Petroleum Technology 48 (8): 16-21 and A. R. Bhandari, P. B. Flemings, P. J. Polito, M. B. Cronin, S. L. Bryant, "Anisotropy and Stress Dependence of Permeability in the Barnett Shale", Transport in Porous Media 108 (2):393-41. Moreover, natural and hydraulic fractures may become stress-sensitive during production:

$$k_F = k_{Fi} f(p_F) \tag{11}$$

Figure 13:
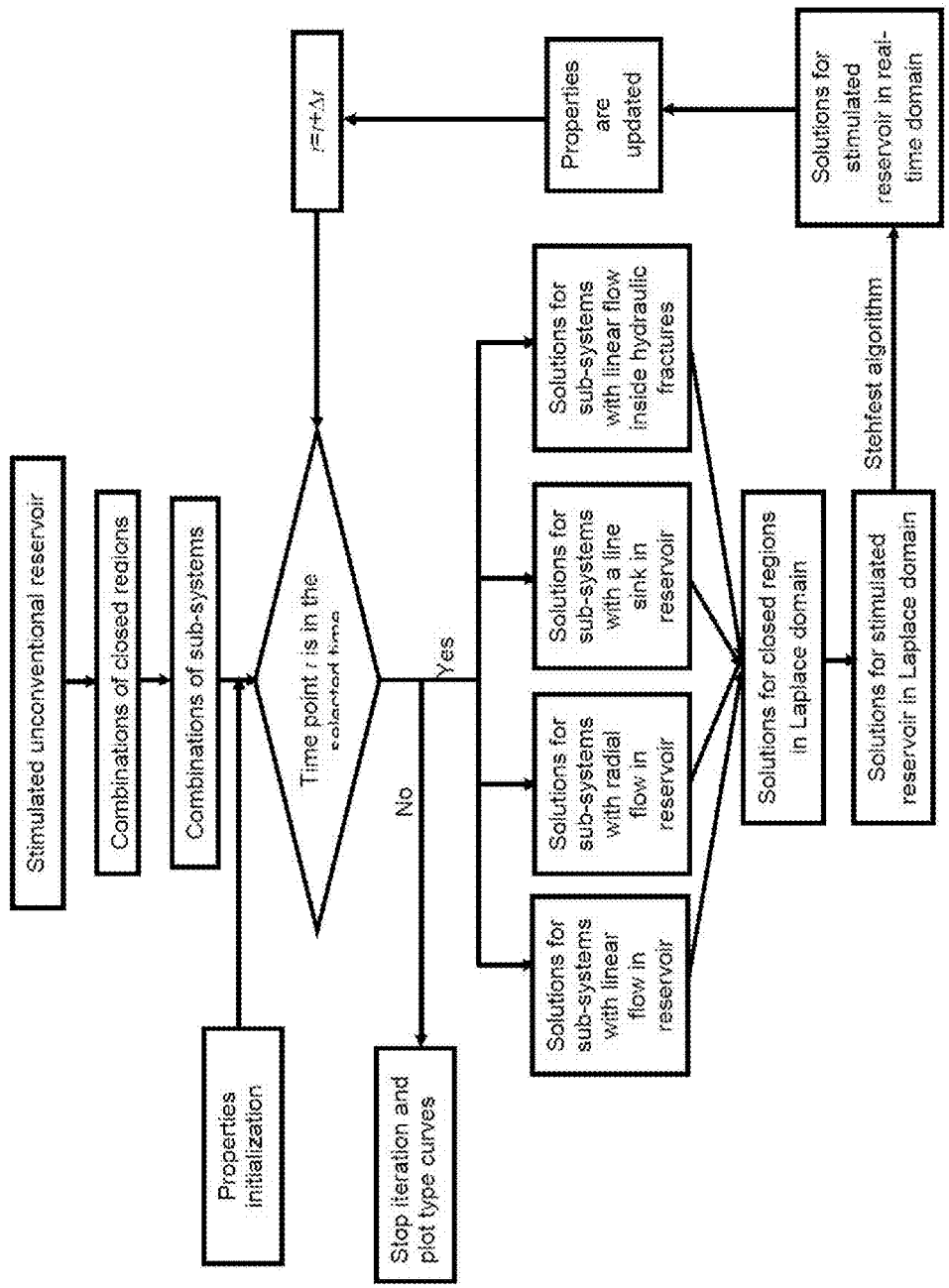
FIG. 13 illustrates an aspect of the subject matter in accordance with one embodiment.

The semi-analytical method in this invention can model the impact of above flow mechanisms on hydrocarbon production. At initial time point, embodiments herein initialize properties of reservoir matrix and fractures in all flow sub-systems. Then pressure/flow rates field are calculated for all flow sub-systems. Reservoir matrix and fracture properties are updated based on the pressure/flow rates field. Then the updated properties are used for next time step calculation. This iterative process can continue until last time step. Overall, in this invention reservoir matrix and fracture properties can change with time smoothly in every flow sub-system and any two flow sub-systems can have different properties. FIG. 13 (deleted) provides a flow chart that summarizes the modeling scheme. This scheme applies to basic and complex combinations of flow sub-systems.

By applying this semi-analytical method, reservoir heterogeneity, dual porosity and complex flow mechanisms can occur simultaneously in one closed production region. Take Region 1 in FIG. 6 for example. Flow sub-system 1.1 can be single-porosity. Flow sub-systems 1.2 and 1.3 are dual-porosity and the inside natural fractures are stress-sensitive. But reservoir matrix and fracture properties can be different in flow sub-system 1.2 and 1.3. For flow sub-system 1.4, hydraulic fractures are stress-sensitive. Gas slippage and Knudsen diffusion play a role in flow sub-systems 1.1, 1.2 and 1.3. It summarizes that a closed production region can have plenty of flow sub-system combinations while each flow sub-system can have plenty of property combinations. Although the present invention has been described with preferred embodiments, it is to be understood that modifications and variations may be utilized without departing from the spirit and scope of this invention.

The above solutions are based on liquid hydrocarbon production. To use the solutions and type curves for gas flow, the dimensionless pressure should be expressed in terms of real gas pseudopressure. The definition of pseudopressure can be found via the reference Al-Hussainy, R., Ramey Jr., H. J., Crawford, P. B "The Flow of Real Gases Through Porous Media" Journal of Petroleum Technology 18(5):624-636.

Type curves can be used to match and predict production of the stimulated unconventional reservoir. Type curves are grouped under given reservoir and fracture properties of each flow sub-system in the model. Based on known information, one can at first select groups of type curves that conform to the information. Put type curves above filed production data under exactly same coordinate system. If one type curve can best fit field data, conditions behind the type curve represent the unknown reservoir and hydraulic fracturefracture properties. The trend of such type curve also implies the possible future production behavior. One can collect as much information as possible to reduce time spent in matching and predicting. Generation of the type curves as outlined herein provides different models and scenarios for consideration in reviewing or understanding the potential reservoir production from the present method.

Reservoir Properties:

The types of reservoir properties which could be assigned to individual flow sub-systems for the purpose of modeling the production therefrom include various types of reservoir properties. The reservoir properties could be selected from a group of reservoir properties or a group of fracture properties.

The reservoir properties selected from include matrix permeability and matrix porosity. The at least one set of reservoir properties assigned to each flow sub-system could also be selected from the group of linear flow from reservoir to hydraulic fractures, flow towards fracture tips, and flow inside hydraulic fractures. Where fracture properties are used as reservoir properties assigned to a particular flow sub-system, these could include properties of natural fracture or hydraulic fracture, including fracture permeability, fracture porosity, fracture thickness/width, fracture stress-sensitivity, and hydraulic fracture half-length.

The same reservoir properties could be assigned to one or more flow sub-systems.

Figure 12:
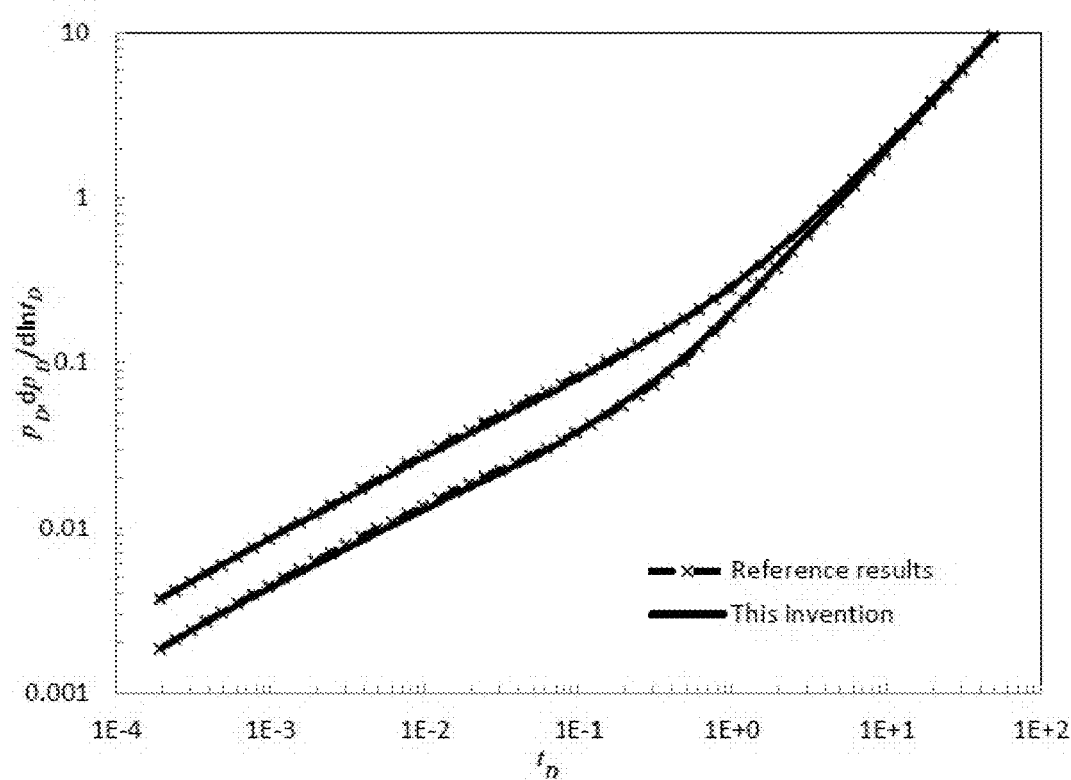
FIG. 12 is a sample of a type curve produced by the method of modeling hydrocarbon flow from a fractured unconventional reservoir of the present invention.

Considering Type Curves Yielded:

FIG. 12 selects two type curves created based on the geometry of FIG. 5. In FIG. 12, the dash line shows the type curve generated based on the method of reference S. Yao, F. Zeng, H. Liu, G. Zhao, "A Semi-analytical Model for Multi-stage Fractured Horizontal Wells" Journal of Hydrology 507: 201-212. The solid line shows the type curve based on this invention. For simplicity, the whole production reservoir block is assumed homogeneous here. FIG. 12 shows that the two methods give almost the same results. However, the time of generating type curves in this invention is dramatically shorter than that used by the reference's method. The differences regarding calculation time become wider when more hydraulic fractures are included. The following are the times to compute the type curves shown in FIG. 12, which demonstrates the significant time benefit:

|  | Calculation time of this invention | Calculation time of reference method |
|---|---|---|
| 3 Hydraulic Fractures | 3 seconds | 19 minutes |
| 6 Hydraulic Fractures | 5 seconds | 51 minutes |
| 12 Hydraulic Fractures | 8 seconds | 140 minutes |

Calculation time is also dependent on computers' processing power. Better computers will further narrow down the calculation time. In general, this invention provides a fast and reliable method of generating type curves for stimulated unconventional reservoirs.

Computer Software:

The method of the present invention could also be reduced to practice in a computer software program—in fact beyond the mathematical method outlined herein, the creation of a computer software approach to the rendering of type curves in accordance with the present invention is contemplated to be the most likely commercial embodiment hereof. The development of computer software embodying the method of the present invention will all be contemplated and understood within the scope of the present invention.

The software of the present invention, being a non-transitory computer-readable storage medium for use in a method of modeling hydrocarbon flow from a fractured unconventional reservoir, the computer-readable storage medium including instructions that when executed by a computer, cause the computer to:

assemble relative data corresponding to an unconventional reservoir which has been subjected to multi-stage hydraulic fracturing;
using the relative data:
define a production reservoir block being the primary hydrocarbon producing region within the unconventional reservoir and calculate reservoir dimensions of length, width and height of the production reservoir block; and defining the location and characteristics of each hydraulic fracture within the production reservoir block;
subdivide the production reservoir block into a plurality of closed production regions, each closed production region containing at least one hydraulic fracture therein and calculate region dimensions of length, width and height for each closed production region;
subdivide each closed production region into a plurality of flow sub-systems; and
assign at least one set of reservoir properties to each flow sub-system
model the sub-system hydrocarbon flow for each of the plurality of flow sub-systems based upon the at least one set of reservoir properties assigned thereto and the relative data corresponding to the flow sub-system;
model region hydrocarbon flow for each closed production region by coupling the calculated sub-system hydrocarbon flows for each of the flow sub-systems within said closed production region; and
model reservoir hydrocarbon flow for the unconventional reservoir by coupling the calculated region hydrocarbon flows for each of the plurality of closed production regions.

Effectively the software of the present invention could at its highest level allow for the computer-assisted execution of the method of modeling hydrocarbon flow from a fractured unconventional reservoir shown in FIG. 1 through FIG. 3. In addition to the basic modeling of the reservoir hydrocarbon flow, type curves could be plotted for use based on the results thereof.

The parameter assignments and calculations performed by the software would be as outlined above with respect to the method of modeling hydrocarbon flow from a fractured unconventional reservoir.

The computer software of the present invention would be capable of the development of couplable differential equations, for execution of embodiments of the method comprised the rendering of sub-system partial differential flow equations and region partial differential flow equations which were couplable to yield a solution representing the reservoir hydrocarbon flow in a reservoir flow equation.

FIG. 13 (deleted) demonstrates one embodiment of the method of the present invention carried out in computer software.

What is claimed is:

1. A method of modeling hydrocarbon flow from an unconventional reservoir which has been subjected to multi-stage hydraulic fracturing using relative reservoir data sampled in respect of the reservoir, said method comprising:
  a. selecting a production reservoir block, being a primary hydrocarbon producing region within the reservoir, using the relative reservoir data;
  b. calculating the reservoir dimensions of length, width and height of the production reservoir block;
  c. identifying a fracture location and a plurality of fracture properties of each hydraulic fracture within the production reservoir block;
  d. using a portion of the relative reservoir data corresponding to the production reservoir block and the fracture location within the production reservoir block, subdividing the production reservoir block into a plurality of closed production regions each containing at least one hydraulic fracture therein;
  e. calculating a region dimensions of length, width, and height for each closed production region;

f. subdividing each closed production region into a plurality of flow sub-systems based upon the fracture locations within the region and the relative reservoir data in respect of the closed production region, each flow sub-system representative of a relatively homogeneous production zone within the closed production region;

g. in respect of at least one selected point in time:
   i. assigning at least one reservoir property sampled at the selected point in time to each flow sub-system;
   ii. calculating a sub-system hydrocarbon flow for each flow sub-system using the at least one reservoir property assigned thereto along with the portion of the relative reservoir data corresponding to the flow subsystem, each calculated sub-system hydrocarbon flow being a couplable formulaic result which can be coupled to other calculated sub-system hydrocarbon flows for other sub-systems within the same closed production region;
   iii. calculating a region hydrocarbon flow for each closed production region by coupling the calculated sub-system hydrocarbon flows for each of the flow sub-systems within said closed production region, each calculated region hydrocarbon flow being a couplable formulaic result which can be coupled to other calculated region hydrocarbon flows for other closed production regions within the reservoir production block; and
   iv. calculating the reservoir hydrocarbon flow for the reservoir by coupling the region hydrocarbon flows for each of the plurality of closed production regions.

2. The method of claim 1 wherein sub-system hydrocarbon flow for at least one of the plurality of flow sub-systems is calculated in respect of a plurality of selected points in time, and further comprising the step of generating at least one type curve displaying the calculated sub-system hydrocarbon flow for the selected flow sub-system on one axis thereof and the related selected points in time on another axis thereof.

3. The method of claim 1 wherein region hydrocarbon flow for at least one of the plurality of closed production regions is calculated in respect of a plurality of selected points in time, and further comprising the step of generating at least one type curve displaying the calculated region hydrocarbon flow for the selected closed production region on one axis thereof and the related selected points in time on another axis thereof.

4. The method of claim 1 wherein reservoir hydrocarbon flow is calculated in respect of a plurality of selected points in time, and further comprising the step of generating at least one type curve displaying the calculated reservoir hydrocarbon flow for the production reservoir block on one axis thereof and the related selected points in time on another axis thereof.

5. The method of claim 1, wherein the relative reservoir data are selected from the group of mineral land data, production history, fracture treatment record and microseismic activity corresponding to the reservoir.

6. The method of claim 1 wherein the at least one reservoir property assigned to a flow sub-system is selected from a group of reservoir properties or a group of fracture properties related to the flow sub-system area within the reservoir production block.

7. The method of claim 6 wherein the reservoir properties selected from include matrix permeability and matrix porosity.

8. The method of claim 6 wherein the fracture properties are properties of hydraulic fracture and natural fracture.

9. The method of claim 8 wherein the fracture properties selected from include fracture permeability, fracture porosity, fracture thickness/width, fracture stress-sensitivity, and hydraulic fracture half-length.

10. The method of claim 1 wherein sub-system hydrocarbon flow for each of the plurality of flow sub-systems is a partial differential flow equation representing the determined hydrocarbon flow for said flow sub-system.

11. The method of claim 10 wherein the solution to each sub-system partial differential flow equation represents production pressure and production volume rate for the corresponding flow sub-system.

12. The method of claim 10, wherein each sub-system partial differential flow equation comprises at least one of a linear flow equation, a radial flow equation, or a source/sink function.

13. The method of claim 1 wherein region hydrocarbon flow for each closed production region is calculated by coupling the sub-system partial differential flow equations for each of the plurality of flow sub-systems within said closed production region to yield a partial differential region partial differential flow equation, whereby each region partial differential flow equation can be coupled to region partial differential flow equations for other closed production regions within the production reservoir block.

14. The method of claim 13 wherein the solution to each region partial differential flow equation represents production pressure and production volume rate for the corresponding closed production region.

15. The method of claim 13 wherein the reservoir hydrocarbon flow is calculated by coupling the region partial differential flow equations for all of the plurality of closed production regions within the production reservoir block, to yield a reservoir flow equation.

16. The method of claim 15 wherein the result of the reservoir flow equation is the anticipated hydrocarbon production from the production reservoir block adjusted for the unconventional geology and multiple fractures therein.

17. The method of claim 15 wherein the solution to the reservoir flow equation represents production pressure and production volume rate for the unconventional reservoir.

18. The method of claim 1 wherein at least one hydraulic fracture in at least one closed production region is centered in the closed production region.

19. The method of claim 1 wherein at least one hydraulic fracture in at least one closed production region is uncentered in the closed production region.

20. The method of claim 1 wherein the at least one reservoir property assigned to each flow sub-system is selected from the group of linear flow in reservoir, linear flow from reservoir to hydraulic fractures, flow towards fracture tips, and flow inside hydraulic fractures.

21. The method of claim 20 wherein the at least one reservoir property assigned to each flow sub-system within the production reservoir block is the same.

22. The method of claim 20 wherein the at least one reservoir property assigned to individual flow sub-systems within the production reservoir block varies.

23. The method of claim 1 wherein the region dimensions of at least one closed production region are modified from the region dimensions initially calculated based on the hydraulic fracture locations and the relative reservoir data.

24. A non-transitory computer-readable storage medium for use in a method of modeling hydrocarbon flow from an unconventional reservoir which has been subjected to multistage hydraulic fracturing using relative reservoir data sampled in respect of the reservoir, the computer-readable storage medium including instructions that when executed by a computer, cause the computer to:
a. select a production reservoir block, being the primary hydrocarbon producing region within the reservoir, using the relative reservoir data;
b. calculate the reservoir dimensions of length, width and height of the production reservoir block;
c. identify the fracture location in fracture properties of each hydraulic fracture within the production reservoir block;
d. using the portion of the relative reservoir data corresponding to the production reservoir block and the location of the hydraulic fractures within the production reservoir block, subdivide the production reservoir block into a plurality of closed production regions, each containing at least one hydraulic fracture therein;
e. calculate the region dimensions of length, width and height for each closed production region;
f. subdivide each closed production region into a plurality of flow sub-systems based upon the fracture locations within and the relative reservoir data in respect of the closed production region, each flow sub-system representative of a relatively homogenous production zone within the closed production region;
g. in respect of least one selected point in time:
  i. assign at least one reservoir property sampled at the selected point in time to each flow sub-system;
  ii. calculate the sub-system hydrocarbon flow for each of the flow subsystems using the at least one reservoir property assigned thereto along with the portion of the relative reservoir data corresponding to the flow sub-system, each calculated sub-system hydrocarbon flow being a couplable formulaic result which can be coupled to other calculated subsystem hydrocarbon flows for other subsystems within the same closed production region;
  iii. calculate the region hydrocarbon flow for each closed production region by coupling the calculated sub-system hydrocarbon flows for each of the flow sub-systems within said closed production region, each calculated region hydrocarbon flow being a couplable formulaic result which can be coupled to other calculated region hydrocarbon flows for other closed production regions within the reservoir production block; and
  iv. calculate the reservoir hydrocarbon flow for the reservoir by coupling the calculated region hydrocarbon flows for each of the plurality of closed production regions.

25. The computer-readable storage medium of claim 24 wherein sub-system hydrocarbon flow for at least one of the plurality of flow sub- systems is calculated in respect of a plurality of selected points in time, and wherein said instructions further cause the computer to generate at least one type curve displaying the calculated sub-system hydrocarbon flow on one axis thereof and the related selected points in time on another axis thereof.

26. The computer-readable storage medium of claim 24 wherein region hydrocarbon flow for at least one of the plurality of closed production regions is calculated in respect of a plurality of selected points in time, and wherein said instructions further cause the computer to generate at least one type curve displaying the calculated region hydrocarbon flow on one axis thereof and the related selected points in time on another axis thereof.

27. The computer-readable storage medium of claim 24 wherein region hydrocarbon flow is calculated in respect of a plurality of selected points in time, and wherein said instructions further cause the computer to generate at least one type curve displaying the calculated reservoir hydrocarbon flow for the production reservoir block on one axis thereof and the related selected points in time on another axis thereof.

28. The computer-readable storage medium of claim 24, wherein the relative reservoir data are selected from the group of mineral land data, production history, fracture treatment record and microseismic activity corresponding to the reservoir.

29. The computer-readable storage medium of claim 24 wherein the at least one reservoir property assigned to a flow sub-system is selected from a group of reservoir properties or a group of fracture properties.

30. The computer-readable storage medium of claim 29 wherein the reservoir properties selected from include matrix permeability and matrix porosity.

31. The computer-readable storage medium of claim 29 wherein the fracture properties are properties of hydraulic fracture and natural fracture.

32. The computer-readable storage medium of claim 31 wherein the fracture properties selected from include fracture permeability, fracture porosity, fracture thickness/width, fracture stress-sensitivity, and hydraulic fracture half-length.

33. The computer-readable storage medium of claim 24 wherein sub-system hydrocarbon flow for each of the plurality of flow sub-systems is calculated by creating a partial differential flow equation representing the determined hydrocarbon flow for said flow sub-system.

34. The computer-readable storage medium of claim 33 wherein region hydrocarbon flow for each closed production region is calculated by coupling the sub-system partial differential flow equations for each of the plurality of flow sub-systems within said closed production region to yield a region partial differential flow equation, whereby each region partial differential flow equation can be coupled to region partial differential flow equations for other closed production regions within the production reservoir block.

35. The computer-readable storage medium of claim 34 wherein the reservoir hydrocarbon flow is calculated by coupling the region partial differential flow equations for all of the plurality of closed production regions within the production reservoir block, to yield a reservoir flow equation.

36. The computer-readable storage medium of claim 35 wherein the solution to the reservoir flow equation represents production pressure and production volume rate for the unconventional reservoir.

37. The computer-readable storage medium of claim 34 wherein the result of the reservoir flow equation is the anticipated hydrocarbon production from the production reservoir block adjusted for the unconventional geology and multiple fractures therein.

38. The computer-readable storage medium of claim 34 wherein the solution to each region partial differential flow equation represents production pressure and production volume rate for the corresponding closed production region.

39. The computer-readable storage medium of claim 33 wherein the solution to each subsystem partial differential flow equation represents production pressure and production volume rate for the corresponding flow sub-system.

40. The computer-readable storage medium of claim 24 wherein at least one hydraulic fracture in at least one closed production region is centered in the closed production region.

41. The computer-readable storage medium of claim 24 wherein at least one hydraulic fracture in at least one closed production region is uncentered in the closed production region.

42. The computer-readable storage medium of claim 24 wherein the at least one reservoir property assigned to each flow sub-system is selected from the group of linear flow in reservoir, linear flow from reservoir to hydraulic fractures, flow towards fracture tips, and flow inside hydraulic fractures.

43. The computer-readable storage medium of claim 42 wherein the at least one reservoir property assigned to each flow sub-system within the production reservoir block is the same.

44. The computer-readable storage medium of claim 42 wherein the at least one reservoir property assigned to individual flow sub-systems within the production reservoir block varies.

45. The computer-readable storage medium of claim 44, wherein each sub-system partial differential flow equation comprises at least one of a linear flow equation, a radial flow equation, or a source/sink function.

46. The computer-readable storage medium of claim 24 wherein the region dimensions of at least one closed production region are modified from the region dimensions initially calculated based on the hydraulic fracture locations and the relative reservoir data.

* * * * *